United States Patent
Schulz

[11] 3,863,746
[45] Feb. 4, 1975

[54] CENTRIFUGALLY BALANCED ROTATING CLUTCH

[75] Inventor: Gunter W. Schulz, Peoria, Ill.

[73] Assignee: Caterpillar Tractor Co., Peoria, Ill.

[22] Filed: Mar. 30, 1973

[21] Appl. No.: 346,648

[52] U.S. Cl............. 192/106 F, 192/86, 192/113 B
[51] Int. Cl.......................................... F16d 25/063
[58] Field of Search .......... 192/106 F, 87.16, 87.17, 192/86

[56] References Cited
UNITED STATES PATENTS

| | | | |
|---|---|---|---|
| 2,464,538 | 3/1949 | Vanderzee | 192/87.17 |
| 3,099,166 | 7/1963 | Schou | 192/87.17 X |
| 3,243,026 | 3/1966 | Snoy et al. | 192/87.17 |
| 3,295,646 | 1/1967 | Peterson | 192/106 F |
| 3,438,472 | 4/1969 | Hillegass et al. | 192/106 F |

*Primary Examiner*—Benjamin W. Wyche
*Attorney, Agent, or Firm*—Phillips, Moore, Weissenberger, Lempio & Strabala

[57] ABSTRACT

A fluid operated rotating clutch having balancing piston means which effectively negate the pressure effects of fluids compelled by centrifugal force against the clutch actuating mechanism. A balance piston is provided which has an exposed cross-sectional area which is equal to that of the clutch actuating piston, the resultant fluid forces acting upon these areas being substantially equal. Both the actuating piston and balancing piston are housed within closed annular chambers having equal radial dimensions. The balance piston and the actuating piston are interconnected for unitary axial movement.

1 Claim, 1 Drawing Figure

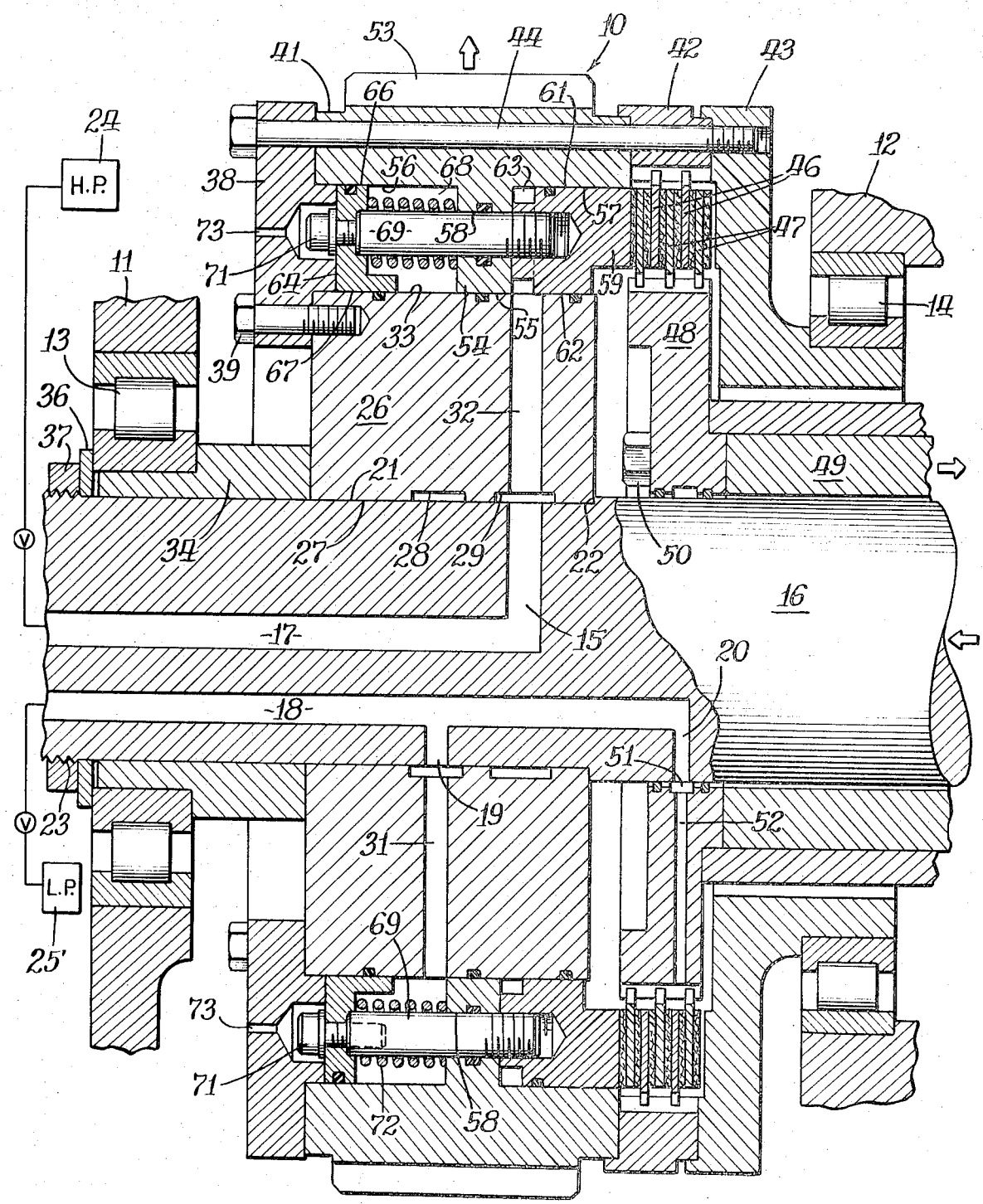

CENTRIFUGALLY BALANCED ROTATING CLUTCH

CROSS-REFERENCE TO RELATED APPLICATIONS

This application relates to U.S. Application Ser. No. 346,650, filed on Mar. 30, 1973, by Gunter Werner Schulz, of common assignment herewith, entitled REMOVABLE SEDIMENT CONTAINER FOR ROTATING FLUID SYSTEM.

BACKGROUND OF THE INVENTION

Rotating clutches of the type disclosed in this application generate centrifugal forces during operation which forces cause system fluids to flow radially outwardly into contact with the actuating piston mechanism provided for selectively engaging and disengaging the clutch. Such rotating clutches frequently employ an independent source of pressurized hydraulic fluid for acting upon the actuating piston to engage or disengage the clutch discs and plates. A problem encountered often in such rotating clutches is the tendency of the clutch discs and plates to remain engaged even when the pressurized hydraulic fluid supplied to the actuating piston has been discontinued. The primary cause for this problem is the pressure created by trapped actuating fluid which is thrown radially outwardly by centrifugal force to create a pressure head within the chamber which houses the actuating piston mechanism.

One solution to this problem is the provision of a counterbalancing fluid compartment which can receive low-pressure fluid and create a pressure head therein which will counteract the centrifugally generated pressure within the actuating piston chamber. Apparatus embodying this particular principle but using different means is shown in U.S. Pat. No. 3,217,851 to Mogk et al., of common assignment herewith. In the Mogk et al apparatus, the dimensions of the counterbalancing chamber and the actuating piston chamber are different and the apparatus is designed so that exact counterbalance of centrifugally generated forces may be achieved only at one speed of rotation.

Other attempts at solving the basic problem, though with drastically different apparatus, are shown in U.S. Pat. Nos. 3,064,780 and 3,224,537 to Richards et al., and Hilpert, respectively.

SUMMARY AND OBJECTS OF THE INVENTION

The instant invention provides an economical and efficient balanced piston rotating clutch. The actuating piston for the clutch is housed within an annular closed fluid chamber which is concentrically disposed within the clutch output gear. The actuating piston is rigidly connected for unitary movement with a balancing piston which is also disposed interiorly of the output gear and within an annular fluid chamber having radial dimensions equal to those of the actuating piston chamber. Both chambers are fed with pressurized fluid by means of radially disposed passages which are in turn supplied through axially disposed passageways in the input shaft of the clutch.

The main object of the present invention is to provide a rotating clutch having a balance piston which has a pressure exposed area equal to that of the clutch actuating piston such that centrifugally generated fluid forces acting upon such pistons are counterbalanced.

Another object of the present invention is to provide a balanced piston rotating clutch having actuating piston and balance piston chambers which are closed and which are in aligned relation so that the respective pistons may be directly coupled for unitary axial movement.

A further object of the present invention is to provide a rotating clutch which is instantaneously disengagable upon the discontinuance of actuating fluid pressure.

Other objects and advantages of the invention will become apparent from the following description and drawing.

BRIEF DESCRIPTION OF THE DRAWING

The sole FIGURE in the drawing is a sectional elevation of a portion of the balanced piston rotating clutch of the present invention showing the major components thereof.

DETAILED DESCRIPTION

With reference to the drawing, a balanced piston rotating clutch which embodies the principles of the present invention is shown generally at 10. The clutch is rotatably supported within a pair of axially spaced stationary housing walls 11 and 12 and is journalled in a pair of bearings 13 and 14. Motor input torque is received by an input shaft 16 and is transmitted to the clutch thereby. A pair of axial passageways 17 and 18 are provided within the input shaft. A pair of radially disposed branch passages 19 and 20 communicate with the passageway 18 and a radial passage 15 communicates with the passageway 17.

The input shaft 16 is equipped with a reduced diameter portion 21 which extends axially away from the normal diameter portion of the shaft and forms an annular shoulder 22 at the juncture therewith. A threaded portion 23 is formed on the reduced diameter portion of the shaft.

A source of high-pressure fluid 24, such as a hydraulic fluid pump or the like, is connected by suitable conduit means to the passageway 17 and is equipped with suitable valving (not shown) to selectively provide a supply of high-pressure fluid to the passageway 17. A similar source of low-pressure fluid 25, such as the motor lubricating oil pump, is connected by means of suitable valved conduits to the passageway 18 for selective supply of low-pressure fluid thereto.

An annular support hub 26, having an internal bore 27, is press-fitted or otherwise fixedly mounted upon the reduced diameter portion of the input shaft 16 in abutting relationship with the annular shoulder 22. Within the internal bore 27, a pair of axially spaced annular grooves 28 and 29 are provided. These annular grooves communicate respectively with the branch passages 19 and 15 in the input shaft 16. Axially spaced radial passages 31 and 32 are formed within the support hub 26 and also communicate respectively with the annular grooves 28 and 29. Passages 31 and 32 transpierce the support hub 26 and intersect the surface 33 on the outer periphery thereof. A spacer member 34 is disposed upon the reduced diameter portion of the input shaft and abuts the support hub and a portion of the bearing 13. Input shaft 16, support hub 26, spacer 34 and bearing 13 are positioned relative to each other by means of a thrust washer 36 and a nut 37 which is screw threadably secured to the threaded portion 23.

An annular end plate 38 is secured to the support hub 26 on the left-end surface thereof, as shown in the drawing, by means of a plurality of bolts 39 or other fasteners and such end plate extends radially outwardly beyond the peripheral surface 33 of the support hub. A hub 41 of an output gear and an annular clutch plate retainer 42 are sandwiched in end-to-end engaging relation between the end plate 38 and a similar rightwardly disposed annular end plate 43. The components are held in this relative disposition by means of a plurality of retaining bolts 44. As may be seen from the drawing, the end plate 43 is rotatably supported within the bearing 14.

A plurality of clutch plates 46 are splined to the clutch plate retainer 42 and are rotatable therewith. The spline connection permits relative axial sliding movement between the clutch plates and the retainer 42. The clutch plates 46 are coaxial with and alternately disposed between a plurality of clutch discs 47. The discs 47 are splined to an output member 48 which is in turn secured to an output quill-shaft 49 by means of a plurality of bolts 50. The clutch plates 46 are freely rotatable past the discs 47 when the rotating clutch assembly is in disengaged condition. An annular groove 51 and a plurality of radial passages, such as the one shown at 52, are provided in the output member 48 to communicate passage 20 with the clutch plates and clutch discs for cooling thereof.

The gear hub 41 has a plurality of gear teeth 53 formed thereon and also includes an inwardly extending radial wall 54. The radial wall terminates in a bore, the internal surface of which is shown at 55, which sealingly engages the outer surface 33 of the support hub 26. A pair of axially spaced annuli 56 and 57 having substantially equal dimensions, are disposed on opposite sides of the radial wall 54. A plurality of longitudinally disposed angularly spaced axial bores 58 transpierce the radial wall. An annular actuating piston 59, having an outer periphery 61, is slidably and sealingly disposed within the annulus 57 and an inner peripheral portion 62 thereof is slidably and sealingly engaged by the surface 33 of the support hub 26. A variable-volume actuating chamber 63 is formed between one end of the actuating piston and the radial wall 54. The opposite-end portion of the actuating piston is disposed for actuating engagement with the most proximate one of the clutch discs 47.

Within the annulus 56, an annular balance piston 64, having an outer periphery 66 slidably and sealingly disposed against the inner periphery of the annulus, and having an internal surface 67 slidingly and sealingly engaging the outer periphery 33 of the support hub, is provided. A variable-volume balance chamber 68 is formed thereby between the balance piston and the radial wall 54.

A plurality of connecting pins 69 are slidably disposed within and through the plurality of bores 58. Each pin has one end thereof threadably secured to the annular actuating piston 59 and the opposite end thereof connected to the balance piston 64 by means of a cap screw 71 or the like. A plurality of compression springs 72 are disposed between the radial wall and the balance piston with each spring encircling a connecting pin 69. The compression springs resiliently bias the balance piston away from the radial wall while urging the actuating piston to be drawn toward the radial wall. A plurality of passages 73 are provided in the end plate 38 to vent the space between the balance piston and the end plate.

Operation

During normal operation of the rotating clutch assembly, fluid from the low pressure fluid source 25 is continuously transmitted through the passageway 18 to the branch passages 19 and 20. The fluid which passes through the branch passage 20 enters the groove 51 and the passages 52 from whence it is splashed onto the clutch plates and discs for cooling purposes. Fluid which passes through the branch passage 19 communicates with the balance chamber 68 by way of the radial passages 31 and assures the maintenance of fluid therein under moderately low pressure. While the clutch assembly is rotating, a pressure head is generated within the balance chamber 68 by means of the centrifugal force applied to the fluid therein. This pressure head adds to the pressure applied from the source 25 and acts upon the balance piston to urge it away from the radial wall 54.

Input torque is transmitted to the rotating clutch 10 through the input shaft 16, as earlier described. Such torque may selectively be taken off at the gear teeth 53. Of course, output torque is always selectively available from the upper shaft 49 when the clutch is in engaged condition.

Engagement of the rotating clutch assembly is accomplished by means of the direction of pressurized fluid from the high pressure source 24 to the actuating chamber 63 by way of the passageway 17, branch passage 15 and radial passage 32. Such pressurized fluid, when communicated to the actuating chamber, causes the actuating piston to move axially away from the radial wall 54 against the combined bias of the springs 72 and the force exerted upon the balance piston by the fluid within the balance chamber. When so urged, the actuating piston engages and forces the clutch discs 47 into frictional contact with the clutch plates 46 to cause lock-up therebetween and to prevent relative rotation thereof. Upon such engagement of the discs and plates, a path for the transmission of output torque from the clutch plate retainer 42 to the output member 48 and the output shaft 49 is provided.

When disengagement of the rotating clutch is desired, communication between the high-pressure source 24 and the passageway 17 is discontinued and the passageway is vented. The actuating chamber 63, though allowed to vent, tends to remain substantially filled with fluid which is held there under the influence of centrifugal force. Both of the chambers 63 and 68 remain in this centrifugally filled condition while the clutch is rotating. However, since the dimensions of the chambers 63 and 68 are substantially identical and the areas upon which the fluid acts are substantially equal, the fluid pressure generated in each of the chambers by centrifugal forces balances. Therefore, the centrifugally generated force acting upon the balance piston is equal to and opposite to that which acts upon the actuating piston. Since the low-pressure source 25 is held in communication with the balance chamber 68, the pressure therein will be slightly greater than that in the actuating chamber and will result in a net force application to the balance piston. This force, acting in concert with the bias of the compression springs 72, is effective to instantaneously move the balance piston, and the actuating piston which is connected thereto, leftwardly to result in the immediate and complete disengagement of the clutch. After such disengagement of the clutch, the components will remain in a balanced mode. In such balanced condition or mode, the clutch will more readily respond to modulated fluid pressure upon reengagement.

In view of the foregoing, it should be apparent that the present invention provides a vastly improved balanced piston rotating clutch which is simple and easily fabricated for an extremely efficient operation. While the invention has been described and shown with particular reference to the preferred embodiment, it will be apparent that variations and modifications of this embodiment are possible within the spirit of the inventive concepts. No limitation with respect to these variations and modifications is intended, except within the purview of the appended claims.

I claim:

1. In a fluid operated rotary clutch having rotatable clutch discs and plates which are movable into frictional engagement for engaging said clutch and movable out of frictional engagement for disengaging said clutch and having fluid pressure responsive actuating means for selectively engaging and disengaging said clutch; balance means for negating the effect of centrifugally generated fluid pressure upon said actuating means, said actuating means including first separate actuator piston means movable in response to fluid pressure for causing said discs and plates to engage said clutch, said balance means including second separate balance piston means connected to and movable with said actuator piston means, said actuator piston means and said balance piston means being housed respectively within separate first and second axially spaced aligned chambers having substantially equal cross-sectional areas and being separated by an annular radial wall, said first and second aligned chambers being annular and the inner and outer radii of each of said first and second chambers being respectively equal, said actuating means further including a source of high pressure actuating fluid and communication means for selectively communicating said high-pressure fluid to said first chamber and for selectively venting said first chamber, said separate first and second aligned annular chambers being separated by said annular radial wall, said wall being transpierced by at least one axial bore, and rod means slidably extending through said at least one axial bore and interconnecting said separate actuator piston means and said separate balance piston means for unitary axial movement thereof, said balance means further including spring means disposed between said annular radial wall and said balance piston means for urging said balance piston means axially away from said annular radial wall, said balance means further including a source of low-pressure fluid and further communication means for selectively communicating said low-pressure fluid to said second chamber and for venting fluid therefrom, said fluid operated rotary clutch further including an annular output gear for providing clutch output torque, and said first and second aligned annular chambers being disposed concentrically within said annular output gear, said fluid operated rotary clutch receiving input torque from a first shaft and said further communication means including a second passageway formed within and extending axially along said first shaft, cooling means for supplying cooling fluid to said discs and plates, said cooling means including a radial passage in communication with said second passageway formed within said first shaft and receiving coolant fluid from said source of low-pressure fluid.

* * * * *